Jan. 21, 1947.   W. W. WOHLFORTH   2,414,684
ELEVATING DEVICE
Filed Oct. 29, 1945   3 Sheets-Sheet 1

INVENTOR
WALTER W. WOHLFORTH
BY John A. Cusiamith
ATTORNEY

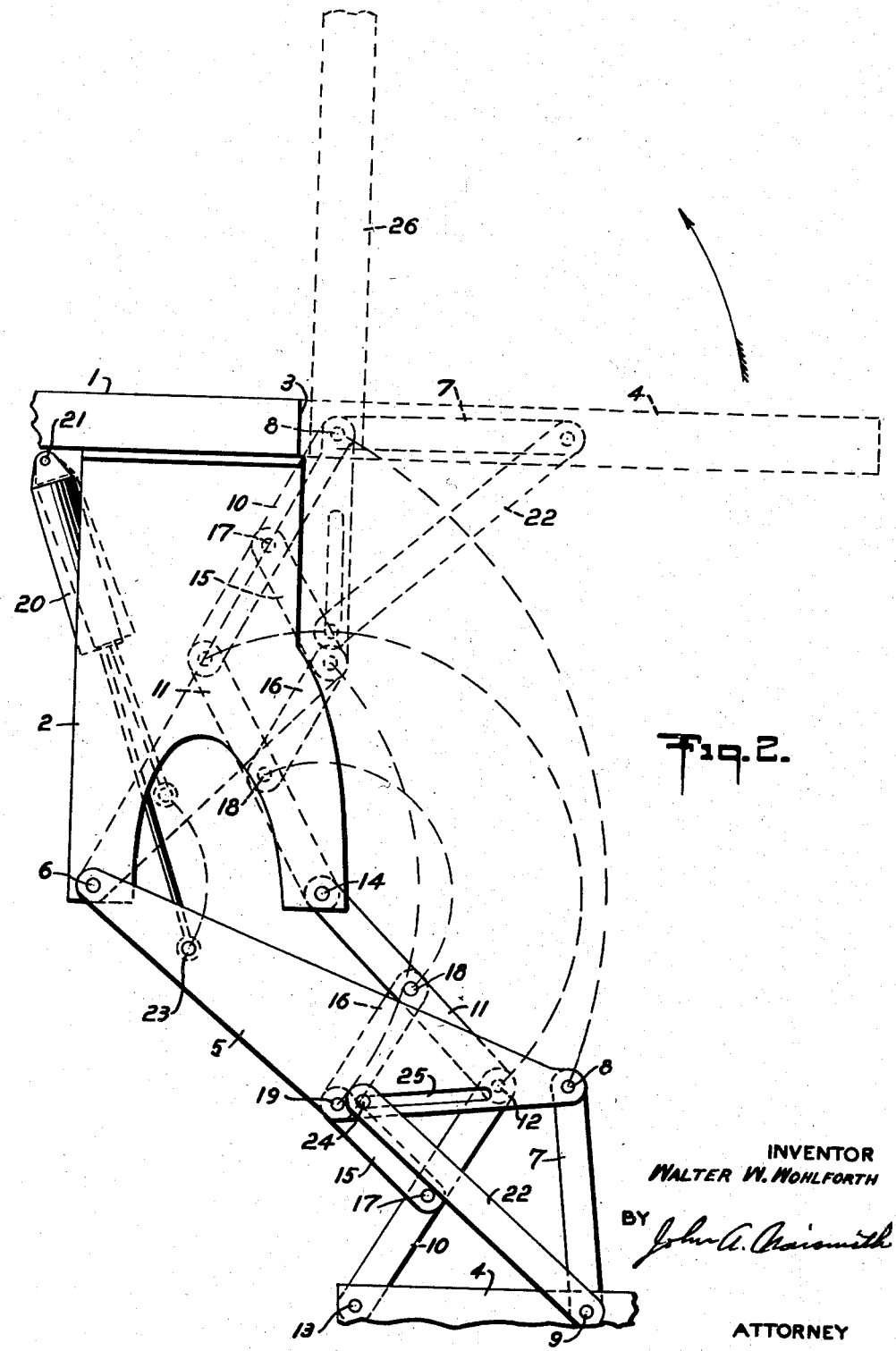

Jan. 21, 1947.    W. W. WOHLFORTH    2,414,684
ELEVATING DEVICE
Filed Oct. 29, 1945    3 Sheets-Sheet 3

INVENTOR
WALTER W. WOHLFORTH
BY
ATTORNEY

Patented Jan. 21, 1947

2,414,684

UNITED STATES PATENT OFFICE 2,414,684

ELEVATING DEVICE

Walter W. Wohlforth, Honolulu, Territory of Hawaii

Application October 29, 1945, Serial No. 625,187

4 Claims. (Cl. 214—75)

The present invention relates particularly to means for elevating heavy or bulky articles from the ground level to the level of the bed of a truck for placing thereon, or lowering goods from the level of the truck body to the ground level.

It is one object of my invention to provide a device of the character indicated that can be readily attached to a truck body, and that will be economical to manufacture, amply strong and durable for the purpose for which it is designed, compact in construction and arrangement.

It is also an important object of my invention to provide a means of the character indicated that can be mounted upon and operated in conjunction with the side of a truck body as well as with the customary tail gate of the vehicle, and that can be used as a part of the vehicle side or end when not in use as an elevator.

In the drawings:

Figure 2 is an end elevational view of my invention in a lowered position on a portion of a vehicle body.

Figure 1:
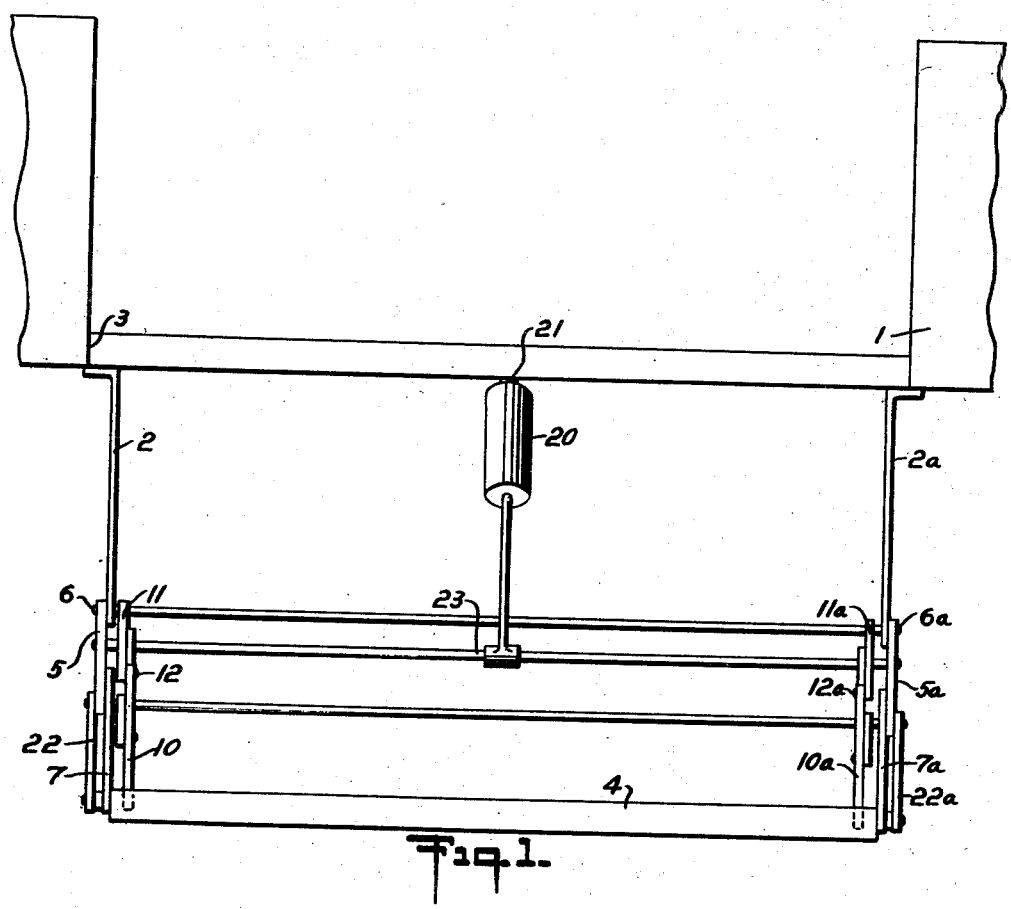
Figure 1 is an elevational view of a portion of a vehicle body with a device embodying my invention mounted thereon.
Figure 3:
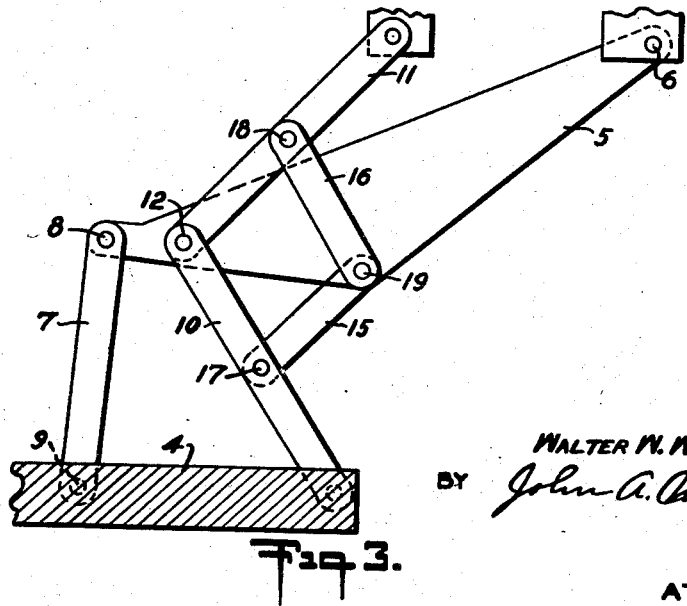
Figure 3 is a view on line 3—3 on Figure 1.

While I have shown and described only the preferred form of my invention, it should be understood that various changes and modifications may be made within the scope of the claims attached hereto without departing from the spirit of the invention.

Referring now more particularly to the drawings, I show at 1 a portion of a truck body, and at 2—2 a pair of supporting members depending therefrom. These supporting members 2—2 are mounted on the under side of the truck bed and at the edge thereof at the point where the loading and unloading is to be done. The edge of the truck body is cut back a distance as at 3 between the spaced supporting members 2—2 a distance substantially equal to the thickness of the platform 4.

The structure now to be described is duplicated at the two ends of the platform 4 so one structure will be described in detail and similar parts in the other will be designated by similar characters followed by the letter "a."

A plate functioning as a lever of the third class is shown at 5 pivotally connected to the lower inner portion of the supporting member 2 as at 6 and having a length equal to the distance between said pivotal point 6 and the center of the end of recess 3. The lever 5 has a link 7 pivotally connected to its free end as at 8, the other end of the link being pivotally connected to the platform 4 as at 9. At 10 and 11 are two links pivotally connected to each other at 12, the other end of link 10 being pivotally connected to the inner edge portion of platform 4 as at 13 and the other end of link 11 being pivotally connected to the lower front edge portion of the supporting member 2 as shown, at 14. The two links 10 and 11 are equal in length and at 15 and 16 I provide two shorter links each being one-half the length of either 10 or 11 and each being pivotally connected to the center of link 10 or 11 as at 17 and 18, the other ends of links 15 and 16 being pivotally connected to each other and to the lever 5 at its apex as at 19, the lever being in the form of a triangle. All of these parts are so proportioned that when the lifting platform 4 is in its lowermost position it is in a horizontal plane and constrain it to hold it in that position during its movement.

Power may be applied in any suitable manner to cause the lever to swing about its pivotal point 6. To effect this movement I have shown a hydraulic cylinder at 20 supported from the bottom of the truck bed at 21, its piston being connected to the lever 5 as at 23.

When power is applied to swing the platform upwardly the several pivotal points 8, 12, 18 and 19 are moved in arcs as indicated by dash lines to their final position when the platform 4 is level with the truck floor as shown.

To provide a suitable support for the platform 4 in its raised position and to provide a suitable closure for the opening in the truck body through which goods are moved, I show a strut 22 pivotally connected to the platform 4 at 9 at one end, the other end being fitted with a pin at 24 which has a sliding engagement with a slot 25 formed in the lever member 5 and extending from a point adjacent the pivot point 19 to a point approaching the pivot point 8. When the platform 4 is in its raised working position the pin 24 is seated in the first named end of the slot and the strut 22 supports the platform in a horizontal position, but when the platform is not needed it is swung about its pivotal point 8 into a vertical position as shown in dotted lines at 26 where it functions as a closure for the opening.

This device may be installed in any desired location, and is not necessarily confined to use in connection with a vehicle. When applied to a vehicle it may be operated in conjunction with a tail gate or with the side wall of the vehicle body.

Figure 4:
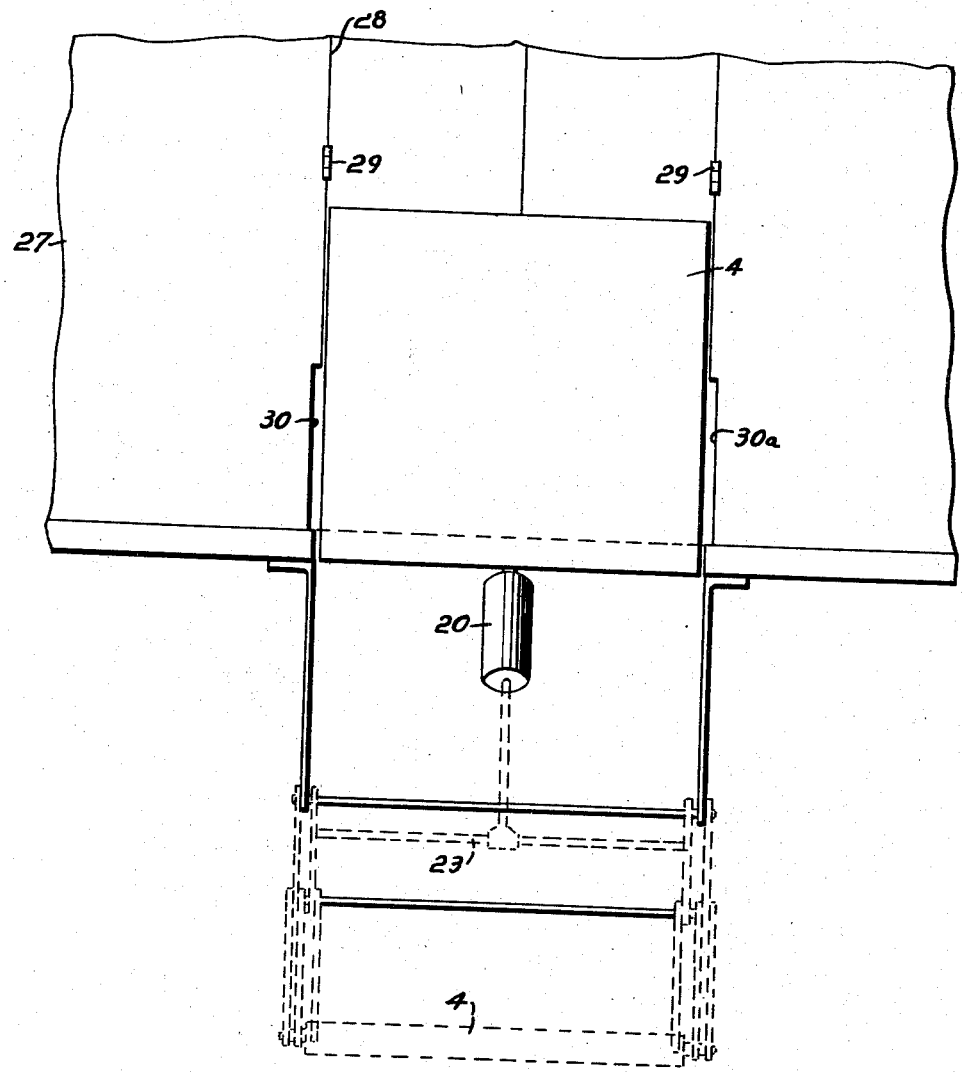
Figure 4 is a rear view of a portion of a vehicle showing the device in raised position; serving as a closure for the vehicle.

In Figure 4 the device is shown as applied to the side of a truck or van which is completely enclosed. In this specific application of the invention a portion of the side wall of the enclosed body portion is shown at 27 and a doorway is formed therein at 28. When elevated and moved into a vertical position the platform forms a closure for the lower portion of the doorway as shown in solid lines and the upper portion of the doorway is closed by means of a pair of doors hingedly mounted therein as at 29. The lower portion of the doorway is provided on each side with a recess as 30—30a to receive certain folding portions of the platform raising mechanism. This construction permits the loading and unloading from the side with obvious advantages and is not permissible with any other known form of loading mechanism.

I claim:

1. A hoisting device of the class described comprising, a pair of spaced supporting members depending from the edge portion of a floor level, a lever pivotally connected to the lower inner portion of each supporting member, and projecting forwardly beyond said edge, an elevating platform disposed below the forward end of said lever, a link connecting the lever end and platform, and a linkage assembly connecting the platform in spaced relation to the above named link and the forward lower edge portion of the supporting member and an intermediate portion of the lever operative to maintain the elevating platform in a horizontal position at every point during its elevation.

2. The structure set forth in claim 1 wherein the lever has a slot formed therein and a link has a slidable connection with said slot at one end and is pivotally connected at its other end with the elevating platform at the point of connection of the first named link thereto.

3. A hoisting device of the class described comprising, a pair of spaced supporting members depending below the edge portion of a floor level, a lever pivotally connected to the lower inner portion of each supporting member and projecting forwardly beyond said edge, an elevating platform disposed horizontally below said lever, a link pivotally connecting the forward lever end and the platform, a pair of links of equal length pivotally connected to each other at one end and pivotally connected to the lower forward portion of the supporting member and to the elevating platform respectively at their other ends, and a pair of links having one-half the length of the aforesaid links pivotally connected together and to the lever at one end and pivotally connected to the center of each of the aforesaid links at their other ends, and means operative to swing the lever about its pivotal point and raise the platform.

4. A device of the character described comprising, in combination with a floor level, hangers depending from the floor, a lever of the third class fulcrumed on each hanger, a raising platform disposed horizontally below the levers, a link pivotally connecting the free end of each lever with the platform, and a linkage assembly pivotally connecting each hanger and the platform and lever operative to hold the platform horizontal during its upward and downward movement.

WALTER W. WOHLFORTH.